July 31, 1962   M. A. LERICHE   3,047,775
PROTECTIVE DEVICE FOR ELECTRICAL APPLIANCE
Filed July 16, 1957
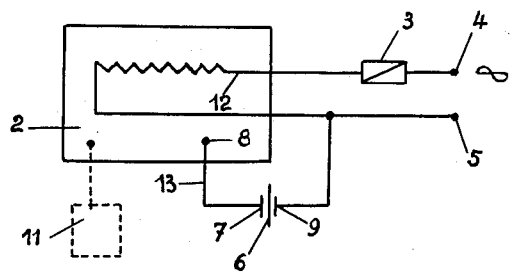
INVENTOR:
MARIE ANDRÉ LERICHE
BY
Richardson, David and Nordon
ATTORNEYS.

United States Patent Office 3,047,775
Patented July 31, 1962

3,047,775
PROTECTIVE DEVICE FOR ELECTRICAL
APPLIANCE
Marie André Leriche, deceased, late of 30 Ave. Brugmann, Brussels, Belgium, by Marie Madeleine Thérèse Leriche, executrix, 45 Rue de la Republique, Amiens, France
Filed July 16, 1957, Ser. No. 672,245
Claims priority, application France July 23, 1956
3 Claims. (Cl. 317—18)

The protection of operators against electrocution through defective insulation in low voltage electric appliances, particularly in domestic appliances, is not generally reliably ensured through the grounding of the appliances. The ground connections when they exist have rarely a sufficiently low resistance for releasing the circuit breaking or disconnecting means.

The invention has for its object a method and means for protecting the operator against the defective insulation of an electric domestic appliance so as to provide a connection with the neutral wire and thereby a disconnection of the appliance as soon as a dangerous voltage appears between the mass of the defective appliance, whether grounded or otherwise, and the neutral wire of the mains.

To this end, the mass of the appliance is connected with the neutral wire of the distributing means through an element of dielectric material clamped between two conductive electrodes, said element being selected and adjusted so as to break down for a voltage which is lower than that of the distributing mains and depends on the protection to be ensured.

The invention covers furthermore by way of a novel article of manufacture, a di-electric element clamped between two electrodes, the electrical characteristic thereof being such that the di-electric is readily perforated when it is subjected to a voltage lower than the operative voltage of the appliance the defective insulation of which is to be detected.

The single figure of the accompanying diagrammatic drawing illustrates by way of example an electric domestic appliance, the protection of the operator against defective insulation of which is ensured by means incorporating my invention.

One terminal of the electric appliance 2 to be protected is connected through a fuse 3 with the phase wire 4 of the distributing mains while its other terminal is connected directly with the neutral wire 5 of said mains.

One of the electrodes 7 of the protecting means is connected at 8 with the mass of the electric domestic appliance 2 against the defective insulation of which the operator is to be protected, the other electrode 9 being connected directly with the neutral wire 5 of the mains. The mass of the appliance 2 may also be connected with a suitable ground at 11.

When a defect in insulation occurs, for instance at point 12, the full operative voltage is applied through the mass 2 of the appliance and the wire 13 connecting the electrode 7 with said mass while the other electrode 9 is connected with the neutral 5.

Assuming the voltage applied to the electrode 7 is equal for instance to 110 volts, while the di-electric element 6 clamped between the electrodes is adjusted for a breakdown voltage of 30 volts, the breakdown produces a short-circuit which melts the fuse 3 or releases the circuit breaker protecting the appliance.

In the protecting means necessary for the execution of the invention, the di-electric element 6 may be constituted by a sheet of mica or of paper clamped between the two electrodes 7 and 9 which may be of copper.

The selection of the dielectric is important because the reliability and uniformity of operation of the protecting means depend on the nature of the dielectric. The latter should allow an easy passage of a spark when the safety voltage allowed between the electrodes is reached. Thus, a sheet of paper which breaks down when subjected to a highly variable voltage depending on hygrometric conditions is not usable for the purpose of protecting the operator of electric domestic appliances.

However, satisfactory results are obtained by the use of a small piece of aluminium covered by a coat of aluminium oxide of a thickness such that it breaks down for a voltage of about 30 volts when it is clamped between two electrodes.

What is claimed:

1. A protection and safety means for an electrical appliance having a conductive body and containing an energy utilization means energized via two lines of a single phase alternating current system, one of said lines having high voltage with respect to the other line, said other line being a neutral line of said system, comprising in combination a circuit connected between said body and said neutral line; a pair of electrodes inserted in said circuit and spaced by a stationary dielectric element clamped therebetween to provide a spark gap therein, said dielectric element being subject to electrical breakdown at a leakage voltage substantially less than half of said high voltage to cause a leakage current to flow through said body and across said gap between the electrodes; and a circuit interrupter in series with said energy utilization means to interrupt application of said high voltage to said energy utilization means when said leakage current flows through said interrupter.

2. A protection and safety means according to claim 1, wherein said dielectric element is an aluminum plate coated on opposite sides with alumina.

3. A protection and safety means according to claim 1, wherein said circuit interrupter is a fuse adapted to melt when said leakage current flows therethrough.

References Cited in the file of this patent

UNITED STATES PATENTS 1,361,967     Copley _____ Dec. 14, 1920

FOREIGN PATENTS 626,818     Germany _____ Nov. 18, 1932
850,796     France _____ Dec. 26, 1939
713,337     Germany _____ Nov. 6, 1941
580,787     Great Britain _____ Sept. 19, 1946